United States Patent Office 3,555,905
Patented Jan. 19, 1971

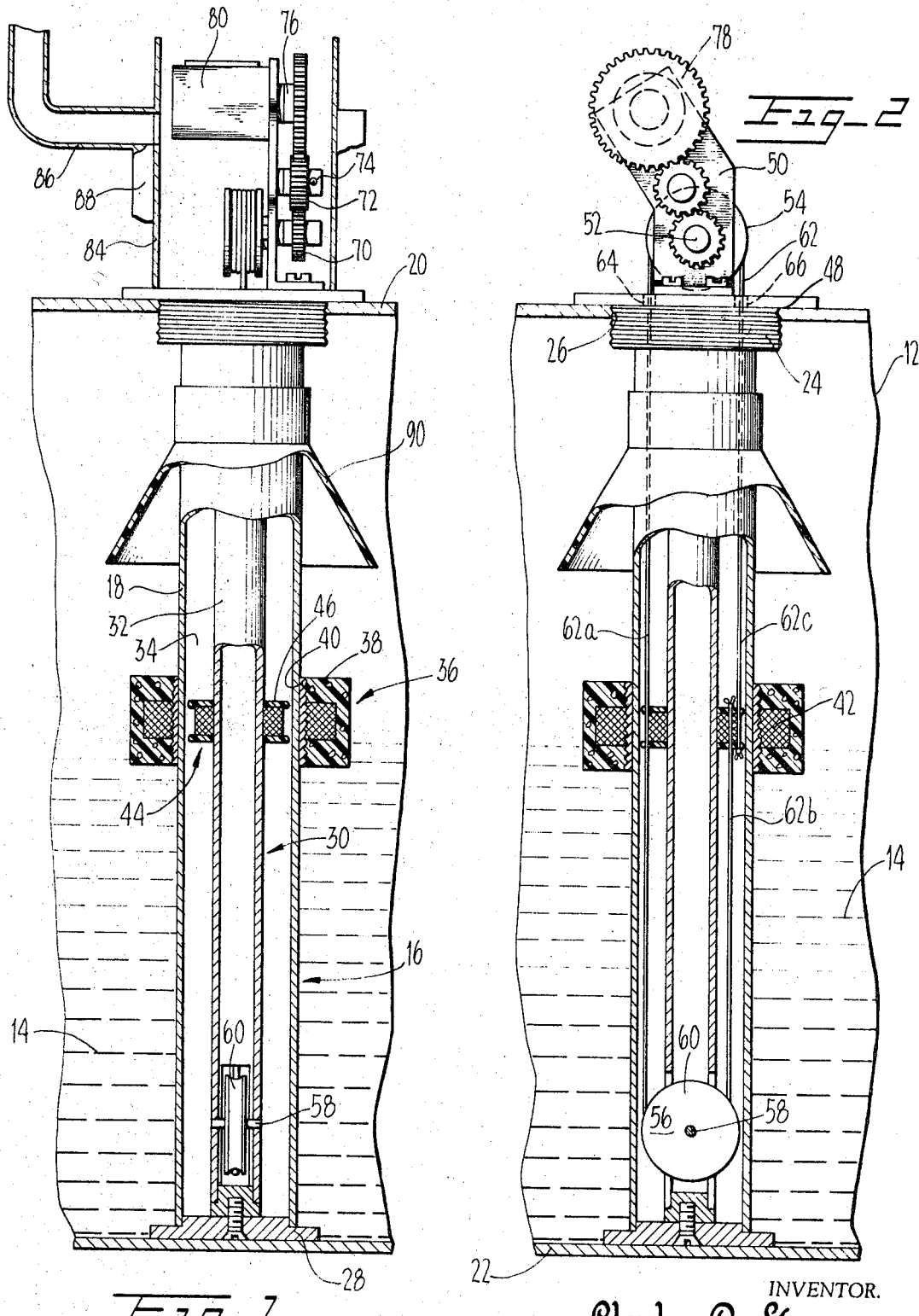

3,555,905
APPARATUS FOR MEASURING LIQUID IN A TANK
Clayton A. George, Fremont, Calif.
(30971 Union City Blvd., Union City, Calif. 94587)
Filed May 21, 1969, Ser. No. 826,583
Int. Cl. G01f 23/12
U.S. Cl. 73—321       1 Claim

ABSTRACT OF THE DISCLOSURE

A fluid measuring device for determining the quantity of liquid in a tank. The device includes a probe member which is inserted into the tank. Slidably mounted on the probe is a float containing a magnet, the float position being determined by the liquid level in the tank. Within the probe is a vertically movable magnetic element whose vertical position is controlled by the exteriorly positioned float. Movement of this element causes selective causes selective rotation of gear members connected to a potentiometer or similar read out device.

BACKGROUND OF THE INVENTION

In many instances it is both desirable and necessary to have an immediate reading of the quantity of liquid in a storage tank. Heretofore, the volumetric determination was made by dip sticks or other manual or time consuming operations.

In accordance with the teachings of the present inventions, a single unit may be readily installed in a tank, either under or above the ground, where accuracy in ascertaining the quantity of liquid is important. The arrangement is such that the actual reading may be made at a point remote from the tank location.

THE DRAWING

FIG. 1 is an elevational front view of a portion of a tank containing liquid, with the apparatus of the present invention operatively installed, shown primarily in cross-section.

FIG. 2 is another elevational view similar to FIG. 1, but taken from a side.

DESCRIPTION OF THE PREFERRED EMBODIMENT

As above suggested, the apparatus of the present invention is designed to be inserted in a tank 12, and as will be presently described, provide a simple and effective means for ascertaining the quantity of liquid 14 within the tank.

With reference to the drawing, the apparatus will be seem to include a vertical probe 16, preferably formed from a cylindrical tube, defining an outer wall 18. The probe is adapted to extend substantially from the top wall 20 of the tank to the bottom wall 22 thereof, and may be releasably supported in a vertical position within the tank by means of an externally threaded fitting 24 which is engageable with an internally threaded bung opening 26 or the like, customarily provided in a tank top wall. The lower end of the probe is covered by a bottom plate 28 which serves as a liquid and vapor seal to the interior of the probe, and it will be noted that the plate extends radially outwardly from the probe to provide a bottom stop for an annular float member which will be hereinafter described.

Disposed within the probe tube and concentrially positioned therein, is an inner cylindrical tube 30 extending from the bottom plate 28 and terminating adjacent the top wall of the tank, the wall 32 of tube 30 being spaced inwardly of probe wall 18 of define an annular space 34 therebetween.

Slidably mounted on probe wall 18 and in telescopic engagement therewith is a float member 36 which is supported by the liquid 14 in the tank and whose vertical position on the probe wall is determined by the liquid level in the tank. The body 38 of the float is formed of any suitable buoyant material, such as a polystyrene foam and is of annular configuration to engage the wall 18. In order to minimize friction between the float body and the probe wall, the body is preferably provided with a liner 40 formed, for example, as a rigid polyvinyl chloride tube having external threads for securing the float body thereto. Embedded in the body 38 is an annular magnet 42 which extends to the liner 40. The function of this magnet will be presently described in some detail.

Disposed within the space 34 defined by walls 18 and 32 is a second annular magnet 44 which is controlled by magnet 42. Thus, as the float magnet 42 moves with the liquid level, the magnet 44 will be likewise vertically displaced. To reduce the friction of the magnet 44 during its vertical travel in space 34, annular Teflon or other low coefficient of friction bearings 46 are disposed on the upper and lower surfaces of the magnet to slidably engage the respective tube walls.

The movement of the second or inner magnet is used to provide a reading of the liquid level or the liquid contents of the tank in the following manner. As will be noted, the probe fitting 24 is provided with a top wall 48. A bracket 50 extends upwardly from such wall, and journalled on such bracket by a shaft 52 is a top pulley 54. Mounted on the bottom closure plate 28 and journalled on inner tube 30 is a second or bottom pulley 56 provided with a shaft 58 carried on opposed portions of wall 32. Other portions of the wall 32 are cut out as indicated at 60 to accommodate the pulley diameter which extends substantially to wall 18. As best seen in FIG. 2, a continuous cord 62 is engaged with both pulleys 54 and 56, and this cord passes through suitable apertures 64 and 66 in the top fitting wall 58. The pulley drums are knurled or roughened to prevent slippage between the cord and pulleys, and preferably several turns of the cord are wrapped around the upper pulley 54 to ensure rotation of such pulley upon movement of the cord.

As will be understood, cord movement, and consequently pulley rotation is effected by connecting the cord 62 to the inner magnet 44. More particularly, and as seen in FIG. 2, one portion 62a of the cord is freely passed through the bearings 46 on one side of the magnet. On the other side of the magnet, one end 62b of the cord passes upwardly from pulley 56 and is secured to the magnet, while the other end 62c of the cord passes downwardly from pulley 54 through aperture 66 and is likewise secured to the magnet. In this manner, vertical movement of magnet 44 as dictated by movement of the float magnet 36 will result in correlated rotation of pulley 54 in either a clockwise or counter-clockwise direction, depending on whether the float is moving upwardly in the tank, as in a filling operation, or downwardly in the tank, as when liquid is being withdrawn.

While it would be possible to obtain a direct reading from the pulley 54 to ascertain the liquid contents, it is preferred that the following system be utilized for this purpose. Mounted on shaft 52 on the side of bracket 50 opposite to that of pulley 54 is a gear 70 which is engaged with a similar gear 72 on a 1 to 1 gear ratio. Gear 72 is likewise carried on the bracket by a shaft 74 parallel to shaft 52. Also carried on a shaft 76 extending from the bracket is a gear 78 whose diameter may be varied, depending on the depth of the tank or the resulting length of the probe. Shaft 76 is connected to a potentiometer 80, electrically charged which thus senses any movement of the magnet in the probe unit.

The potentiometer may be coupled to any suitable meter (not shown) which thus directly and continuously reads the level in the tank. It will also be understood that the potentiometer and the meter can be adjusted to directly read out the quantity of liquid.

Also, the signal at the potentiometer which is carried at a maximum of about 1.5 volts to a bridge (read as a voltage drop across a varying resistor) may be fed into a variable audio oscillator, the latter's signal being fed into a modulator, and transmits the same to a receiver. This can be used to provide for automatic refilling or the like.

The probe parts, such as the tubes 16 and 30 are formed of non-magnetic inert material such as Lucite, and is completely sealed. It is compact and can even be used in the standard bung fitting of a 55 gallon drum.

One additional feature present in the above apparatus relates to the filling of the tank in which a probe unit is installed. As best shown in FIG. 1, if an existing filler opening 84 is already provided, a simple L-fitting 86 may be used to provide an auxiliary fill opening 88. Frequently, it is desired to obtain readings as a tank is being filled, and if the liquid is permitted to engage the outer wall 18 of the probe, it would likewise engage the float 36. The pressure head of the incoming liquid would result in the float being forced downwardly. To avoid this, the float may be protected by providing an inverted conical shield 90 around the probe wall 18, the shield deflecting any liquid introduced above the float.

I claim:
1. A device of the character described comprising a first tubular vertical probe member adapted to be vertically positioned in the liquid in a tank, a second tubular vertical member disposed coaxially within said probe member and defining an annular space therewith, an annular flat magnet slidably mounted on the exterior surface of said probe member and responsive to the height of liquid in the tank, a second annular magnet disposed in said annular space and vertically movable between said tubular members in response to movement of said flat magnet, bearing means on opposed surfaces of said second magnet and slidably engageable with at least one of said tubular members, a pulley having its shaft journalled on said second tubular member adjacent the lower end thereof, said second tubular member having opposed cut out portions through which diametrically opposed portions of said pulley projects into said annular space, a second pulley mounted in overlying relation to said tubular members and connected to signal transmitting means, and a flexible connecting element having one end connected to one portion of said second magnet, then passing under said first mentioned pulley and then passing through another diametrically opposed portion of said second magnet, and then operatively connected to said second pulley.

References Cited

UNITED STATES PATENTS

| | | | |
|---|---|---|---|
| 1,399,150 | 12/1921 | Ott | 73—294 |
| 2,531,774 | 11/1950 | Guthmann | 73—321 |
| 2,683,372 | 7/1954 | Borden | 73—321 |
| 2,771,774 | 11/1956 | Fornasieri | 73—319 |
| 3,283,578 | 11/1966 | Moore | 73—321 |
| 3,393,283 | 7/1968 | Lenning | 73—322.5X |
| 3,417,613 | 12/1968 | Barnstorf | 73—319 |
| 3,459,042 | 8/1969 | Brown | 73—313 |

LOUIS R. PRINCE, Primary Examiner

D. M. YASICH, Assistant Examiner

U.S. Cl. X.R.

73—322.5